US008280375B2

(12) United States Patent
Du et al.

(10) Patent No.: US 8,280,375 B2
(45) Date of Patent: Oct. 2, 2012

(54) SYSTEM AND METHOD FOR MANAGING RADIO LINK FAILURES

(75) Inventors: Shu Du, Richardson, TX (US); Sandeep Bhadra, Dallas, TX (US); Shantanu Kangude, Dallas, TX (US); Ramanuja Vedantham, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 779 days.

(21) Appl. No.: 12/190,437

(22) Filed: Aug. 12, 2008

(65) Prior Publication Data

US 2009/0191874 A1  Jul. 30, 2009

Related U.S. Application Data

(60) Provisional application No. 61/023,704, filed on Jan. 25, 2008.

(51) Int. Cl.
*H04J 3/08* (2006.01)
(52) U.S. Cl. .......................... 455/436; 370/331
(58) Field of Classification Search .................. 455/436, 455/450, 445; 370/331, 328, 244
See application file for complete search history.

(56) References Cited

U.S. PATENT DOCUMENTS

| | | | |
|---|---|---|---|
| 7,209,747 B2 | 4/2007 | Chen | |
| 2004/0185855 A1* | 9/2004 | Storm et al. | 455/445 |
| 2005/0197122 A1* | 9/2005 | Sliva | 455/436 |
| 2006/0206597 A1* | 9/2006 | Kim et al. | 709/220 |
| 2008/0076404 A1 | 3/2008 | Jen | |
| 2010/0255844 A1* | 10/2010 | Fischer et al. | 455/436 |
| 2010/0267378 A1* | 10/2010 | Hamabe et al. | 455/423 |

FOREIGN PATENT DOCUMENTS

WO   WO 2007/149509 A2   12/2007

OTHER PUBLICATIONS

3GPP TS 25.214; 3$^{rd}$ Generation Partnership Project; Technical Specification Group Radio Access Network; Physical Layer Procedures (FDD) Release 5 (Mar. 2002).

* cited by examiner

*Primary Examiner* — George Eng
*Assistant Examiner* — Nizar Sivji
(74) *Attorney, Agent, or Firm* — John R. Pessetto; W. James Brady; Frederick J. Telecky, Jr.

(57) ABSTRACT

A wireless transmit/receive unit (WTRU) (152) in a wireless communications system includes a transceiver (153) for transmitting and receiving data from a plurality of base stations (154, 156, 357) and a controller (151) communicatively coupled to the transceiver (153) and configured to adjust an operation mode of the transceiver (153). In the WTRU (152), adjusting comprises configuring the transceiver (153) to begin a radio link handover procedure responsive to receiving a handover (HO) command from a first of the plurality of base stations (154, 156, 357) over a first communications link, specifying a first time, and reconfiguring the transceiver (153) to begin a radio link interruption procedure responsive to an expiry of the first time prior to completion of the radio link handover procedure. In the WTRU (152), the radio link interruption procedure first attempts to re-establish the first communications link.

12 Claims, 4 Drawing Sheets

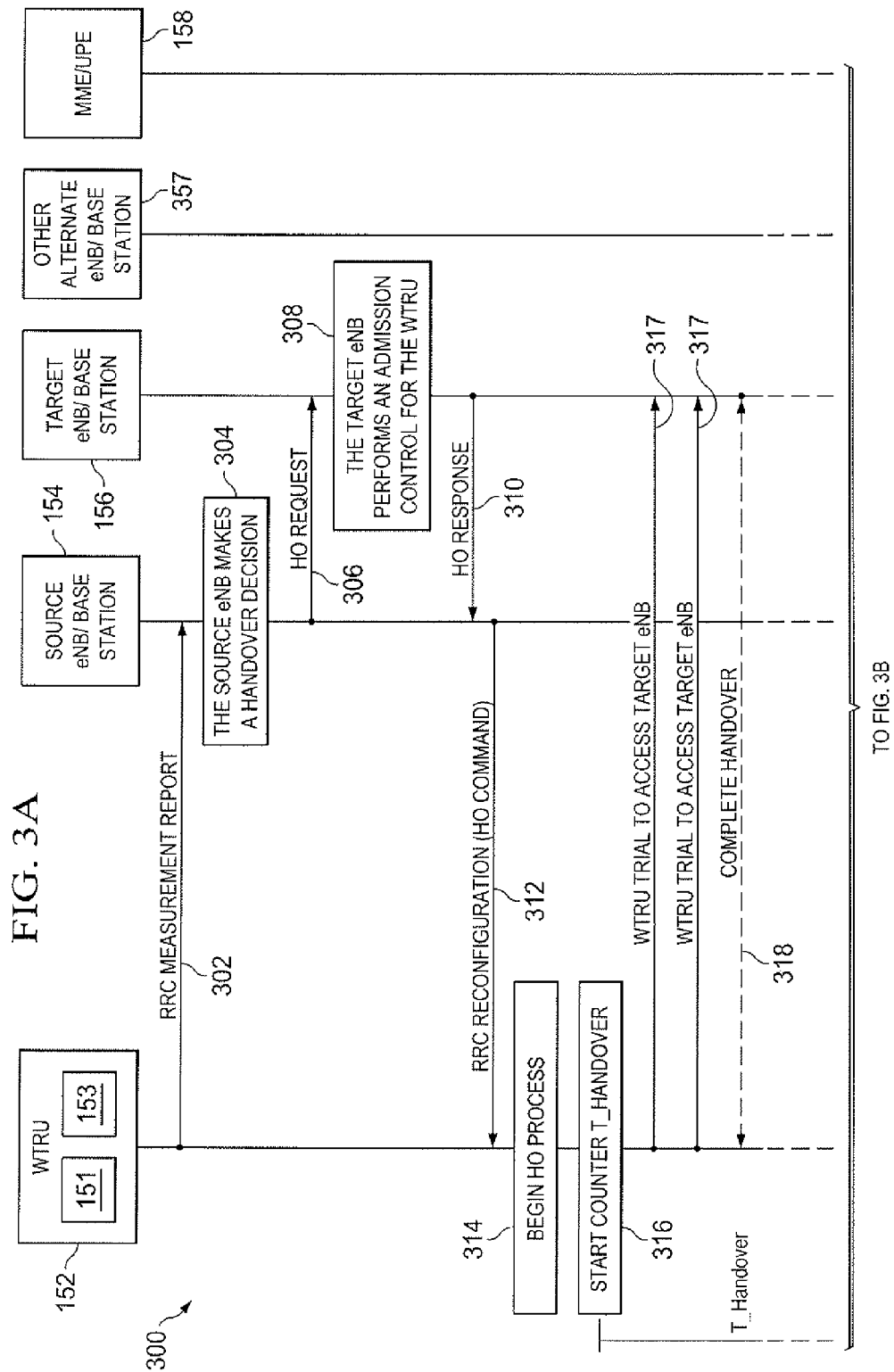

SYSTEM AND METHOD FOR MANAGING RADIO LINK FAILURES

CROSS REFERENCE TO RELATED APPLICATIONS

This application claims the benefit of U.S. provisional application No. 61/023,704 filed Jan. 25, 2008 and entitled "Consistent Radio Link Failure Procedure", which is incorporated by reference as if fully set forth herein.

FIELD OF THE INVENTION

The present invention is related to wireless communication systems. More particularly, the present invention is related to a method and system for managing radio link failures in wireless systems.

BACKGROUND

Long term evolution (LTE) is now being considered for next generation (3.9G) communications system for developing a new radio interface and radio network architecture that provides a high data rate, low latency, packet optimization, and improved system capacity and coverage. For proposed LTE systems, instead of using code division multiple access (CDMA), which is currently being used in 3G systems, orthogonal frequency division multiple access (OFDMA) and single-carrier frequency division multiple access (SC-FDMA) are proposed to be used in downlink and uplink transmissions, respectively. However, the use OFDMA and FDMA typically requires changes in handover procedures and related operations. Specifically, while in IS-95/CDMA2000 systems (based on CDMA technology) it is possible to have soft handovers (make a connection with a new base station before breaking connection with the current base station), this is not possible in LTE. LTE requires hard handovers where connection with the current base station must be broken before establishing connection with a new base station.

Generally, the user equipment (UR) and associated base stations handle all necessary steps for seamless handover in the proposed LTE systems. These steps can include making an intra-LTE handover decision on a source network side, (i.e., control and evaluation of UP and evolved Node-B (eNB) measurements taking into account UE-specific area restrictions), preparing radio resources on a target network side, commanding the USE to interface with new radio resources, releasing radio resources on the source network side, and the like. The UE mobility management mechanism supports the transfer of context data between involved eNBs, and the update of node relations on a control plane (C-plane) and a user plane (U-plane). However, these proposed LTE systems typically do not provide robust procedures for managing radio link interruptions and/or failures during handover and other communications processes.

SUMMARY

This Summary is provided to comply with 37 C.F.R. §1.73, presenting a summary of the invention briefly indicating the nature and substance of the invention. It is submitted with the understanding that it will not be used to interpret or limit the scope or meaning of the claims.

In a first embodiment of the present invention, a wireless transmit/receive unit (WTRU) in a wireless communications system is provided. The WTRU can include a transceiver for transmitting and receiving data from a plurality of base stations and a controller communicatively coupled to the transceiver and configured to adjust an operation mode of the transceiver. In the WTRU, the adjusting comprises configuring the transceiver to begin a radio link handover procedure responsive to receiving a handover (HO) command from a first of the plurality of base stations over a first communications link, specifying a first time, and reconfiguring the transceiver to begin a radio link interruption procedure responsive to an expiry of the first time prior to completion of the radio link handover procedure. In the method, the radio link interruption procedure first attempts to re-establish the first communications link.

In a second embodiment of the present invention, a method for handover of a wireless transmit/receive unit (WTRU) from a source base station to a target base station in a wireless communication system is provided. The method can include configuring the WTRU to begin a radio link handover procedure responsive to receiving a handover (HO) command from the source base station over a first communications link. The method can further include specifying a first time at the WTRU and reconfiguring the WTRU to begin a radio link interruption procedure responsive to an expiry of the first time prior to completion of the radio link handover procedure. In the WTRU, the radio link interruption procedure first attempts to re-establish the first communications link.

BRIEF DESCRIPTION OF THE DRAWINGS

FIGS. 3A and 3B show a signaling diagram of an intra-LIE radio link failure management process in accordance with yet another embodiment of the present invention.

DETAILED DESCRIPTION

Figure 1:
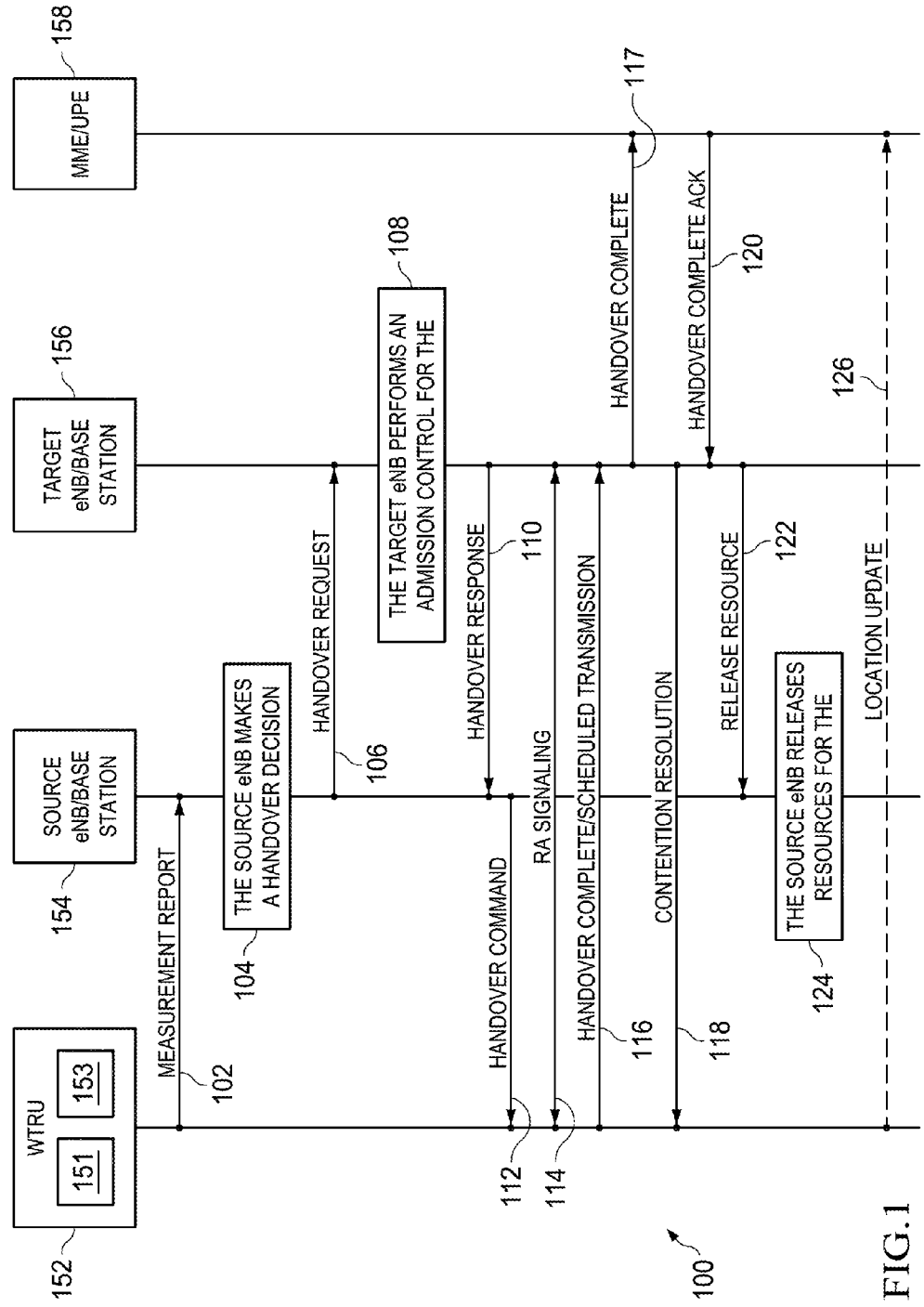
FIG. 1 shows a signaling diagram of handover process for LTE systems configured according to an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As used herein, a "wireless transmit/receive unit" or "WTRU" can include, but is not limited to any particular type of user equipment (UE), a mobile station, a fixed or mobile subscriber unit, a pager, a cellular telephone, a personal digital assistant (PDA), a computer, or any other type of user device capable of operating in a wireless environment. Also as used herein, an "eNB" includes but is not limited to a base station, an evolved Node-B, a site controller, an access point (AP), or any other type of interfacing device capable of operating and supporting communications in a wireless environment. Although the exemplary embodiments will be described in terms of a LTE system, the embodiments of the present invention are not limited in this regard and can be used with other types of communications systems and/or protocols for managing communications between any wireless communications system including a WTRU and an eNB.

Embodiments of the present invention provide systems and methods for managing radio link failures, including radio link failures during handovers. In particular, the various embodiments of the present invention provide for managing handover failures using the same framework used for managing radio link failures and interruptions. That is, the WTRU can be configured to manage failures and interruptions during handover and non-handover processes in a consistent manner by implementing a timer/counter scheme for managing the handover process similar to timer/counter schemes for managing radio link failures during non-handover processes.

FIG. 1 is a signal diagram for an exemplary handover process 100 in an LTE-based wireless communications system configured according to an embodiment of the present invention. As shown in FIG. 1, the WTRU 152 can include a transceiver 153 for communicating with the one or more eNBs and a controller 151 for configuring operation of the WTRU 152, including operation of the transceiver 153. The controller 151 can be configured to perform the one or more tasks for the WTRU 152 in process 100, as well as any tasks required for processes 200, 250, and 300 described below in more detail in FIGS. 2A, 2B, and 3, respectively.

Referring back to FIG. 1, the handover process 100 can begin with a WTRU 152 and a source eNB 154 performing measurements and exchanging measurement reports (step 102). The source eNB 154 then makes a handover decision based on the measurement reports (step 104). The source eNB 154 can then send a handover request to a target eNB 156 (step 106). The handover decision and subsequent procedures before handover completion are performed without involving a mobility management entity/user plane entity (MME/UPE) 158, (i.e., handover preparation messages are directly exchanged between the source eNB 154 and the target eNB 156).

The target eNB 156 performs an admission control for the WTRU 152 (step 108). If the target eNB 156 can accept the WTRU 152, the target eNB 156 sends a handover response to the source eNB 154 (step 110). The source eNB 154 sends a handover command to the WTRU 152 (step 112). For seamless handover, a U-plane tunnel is established between the source eNB 154 and the target eNB 156.

The WTRU 152 and the target eNB 156 then exchange router advertisement (RA) messages (step 114). During handover execution, user data may be forwarded from the source eNB 154 to the target eNB 156. The forwarding may take place in a service dependent and implementation specific way. Forwarding of user data from the source eNB 154 to the target eNB 156 should take place as long as packets are received at the source eNB 154 from the UPE 158.

After a connection to the target eNB 156 is established, the WTRU 152 sends a handover complete message to the target eNB 156 (step 116). The target eNB 156 sends a handover complete message to the MME/UPE 158 (step 117). The target eNB can also send the WTRU 152 a contention resolution message (step 118). The MME/UPE 158 then sends a handover complete acknowledgement (ACK) to the target eNB 156 (step 120). After the MME/UPE 158 is informed by the target eNB 156 that the WTRU 152 has gained an access at the target eNB 156 by the handover complete message, the U-plane path is switched by the MME/UPE 158 from the source eNB 154 to the target eNB 156.

The release of the radio resources at the source eNB 154 is triggered by a release resource message sent by the target eNB 156 (step 122). After receiving the release resource message from the target eNB 156, the source eNB 154 releases the radio resources for the WTRU 152 (step 124). The WTRU 152 can optionally perform a location update with the MME/UPE 158 (step 126).

Typically, handover from a source eNB to a target eNB proceeds without any interruption. However, in some cases, motion of the WRTU or external factors, such as weather conditions, interference from surrounding objects, or interference from other electrical messages, can interrupt the handover process. Therefore, in such cases, a WRTU may need to stop the handover process and revert to the source eNB or may lose a connection altogether and require reconnection to a communications system. Accordingly, the actions the WRTU can vary depending on the type of interruption or error being detected. Therefore, one aspect of the present invention provides for first monitoring and detecting handover process interruptions.

The present Inventors have discovered that in the case of a dedicated preamble, once the routing advertisement (RA) messaging (step 114, referring to FIG. 1 described above) is completed, handover can be considered to have been completed and successful. That is, once a WRTU determines that it can upload and download data from a target eNB, the WTRU can determine that the handover has been completed. Accordingly, handover process interruptions can be detected by determining that the RA messaging was not completed within an allotted timeframe. However, depending on whether a dedicated or a random preamble is used, the point at which a handover can be considered complete can vary.

Figure 2A:
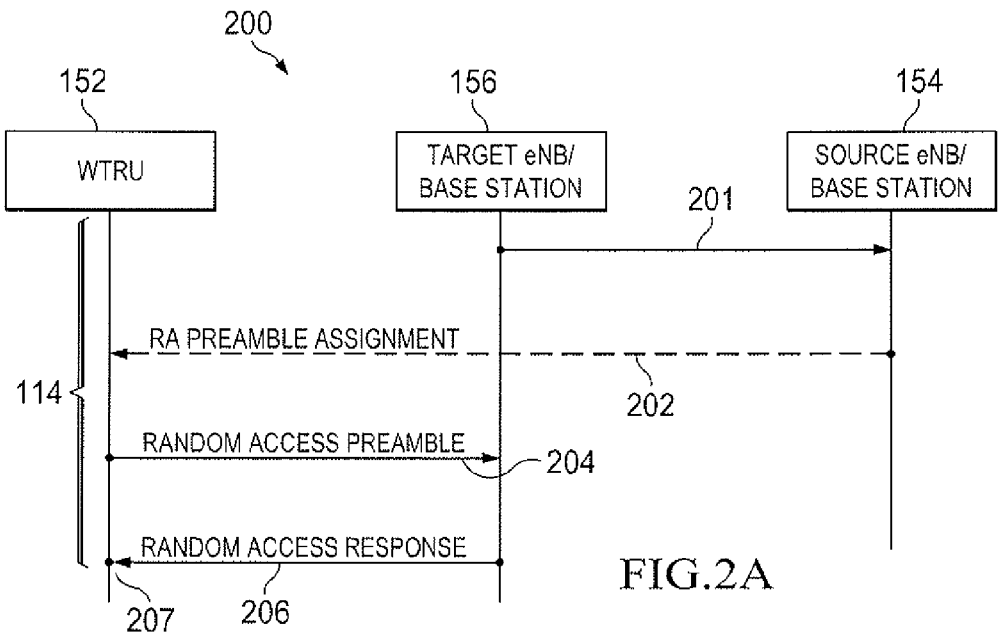
FIG. 2A is a signal diagram of router advertisement messaging using a dedicated preamble for identifying handover process interruptions according to an embodiment of the present invention.

FIG. 2A shows a signal diagram for RA messages 200 using a dedicated preamble for detecting a handover process interruption according to an embodiment of the present invention. In a dedicated preamble scheme, a WTRU and an eNB communicate using uniquely assigned identifiers. That is, the eNB sends an indentifying token to WTRU, so that once the eNB receives this token from the WTRU in a communications from the WTRU, the eNB recognizes the source of the communications and sends confirmation immediately. Therefore, only uploading and downloading capabilities generally need to be confirmed. Therefore, as shown in FIG. 2A, for handover using dedicated preamble, a handover can be considered complete at point 207 once RA messages have been exchanged between a target eNB 152 and a WTRU 156. In embodiments of the present invention using a dedicated preamble, the target eNB 156 can first transmit a RA preamble assignment message indirectly to the WTRU 152. That is, a message is first transmitted to the source eNB 154 in step 201, which includes an the identifier for the WTRU 152 and a request for the source eNB 154 to forward the identifier to the target eNB 156. Afterwards in step 202, the source eNB 154 can forward a preamble assignment message to WTRU 152 (step 202) containing the identifier. Second, in response to the RA preamble assignment message, the WTRU 152 can transmit a random access preamble message (step 204). Third, the target eNB 156 can responsively transmit a random access response message (step 206). Therefore, if the WTRU 152 fails to receive the RA preamble assignment message or the random access response message, point 207 of the signal diagram is not reached (i.e., the WTRU 152 is unable to download data from the target eNB 156) and the WTRU 152 can determine that an interruption of the handover process has occurred and that correction or recovery is needed. The present Inventors note that under many circumstances, a failure to reach point 207 in the signal diagram can occur. By way of example and not by way of limitation, one circumstance is that the target eNB 156 fails to detect the random access preamble message and consequently fails to generate the random access response message. That is, the WTRU 152 is unable to upload data to the target eNB 156.

Figure 2B:
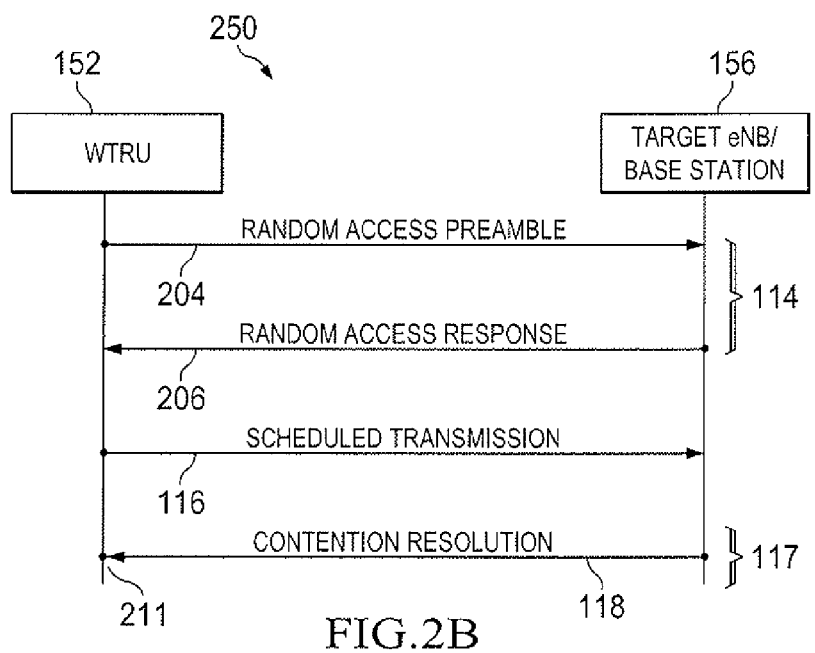
FIG. 2B is a signal diagram of router advertisement messaging using a random preamble for identifying handover process interruptions according to another embodiment of the present invention.

FIG. 2B shows a signal diagram for RA messages 250 using a random preamble for detecting a handover process interruption according to an embodiment of the present invention. In a random preamble scheme, a WTRU and an eNB communicate using randomly assigned identifiers. Therefore, since more than one WTRU could be assigned the same identifier, not only do uploading and downloading capabilities generally need to be confirmed, but also the identity of the proper WTRU (to which downloading has been enabled) needs to be confirmed. This is typically done at the WTRU by determining that a properly configured contention resolution message has been received after completion of step 118 (contention resolution), as shown in FIG. 1. That is, since the eNB has no idea of the identity of the WTRU, so the WTRU has to first send a request first for a token. Only after the eNB receives the request, will it assign the token back the requester.

Therefore, as shown in FIG. 2B, a handover can be considered complete at point 211 once a complete set of messages have been exchanged between a target eNB 156 and a WTRU 152 and a valid contention resolution message has been received at the WTRU 152. In embodiments of the present invention using a random preamble, the target eNB 156 can first transmit a random access preamble message to the WTRU 152 (step 204), which provides the random identifier to the WTRU 152. Second, in response to the random access preamble message, the eNB 156 can transmit a random access response message (step 206). Afterwards, the WTRU 152 can transmit the scheduled message (step 116), as previously described, which includes a message for the target eNB 156 that includes the identifier information for the WTRU 152 and that the handover is complete. Finally, the WTRU 152 confirms handover by receiving a contention resolution from the target eNB 156 that properly identifies the WTRU 152 (step 118), as previously described with respect to FIG. 1.

Therefore, if the WTRU 152 fails to receive the random access response message or a contention resolution message, point 211 of the signal diagram is not reached (i.e., the WTRU 152 is unable to download data from the target eNB 156) and the WTRU 152 can determine that an interruption of the handover process has occurred and that correction or recovery is needed. The present Inventors note that a failure to reach point 211 in the signal diagram can also be caused by various circumstances. By way of example and not by way of limits, a failure can be caused by the target eNB 156 failing to detect the random access preamble message and consequently failing to generate the random access response message. That is, the WTRU 152 is unable to upload data to the target eNB 156. Alternatively, a failure to reach point 211 in the signal diagram can also be caused by a failure of the WTRU 152 to receive a properly configured contention resolution message from the target eNB 156.

Regardless of the type of interruption, another aspect of the present invention provides detailed procedures for signaling and operations at a WTRU, a target eNB, a source eNB, an MME/UPE, and other eNBs in the case of intra-LTE handover process interruption. In particular, in the case of radio link failures, including handover process interruption, embodiments of the present invention attempt to access the target eNB, the source eNB, and other eNB devices sequentially and according to a pre-determined timing. That is, after detection of any type of radio link problem or failure, a limited time is provided for the WTRU to contact an eNB and establish a radio link before attempting (again during a limited time) to establish a connection with another eNB to recover from the failure or problem or enter and idle state if no connection with any eNB can be established. Such an exemplary procedure is described below with respect to FIGS. 3A and 3B.

Figure 3B:
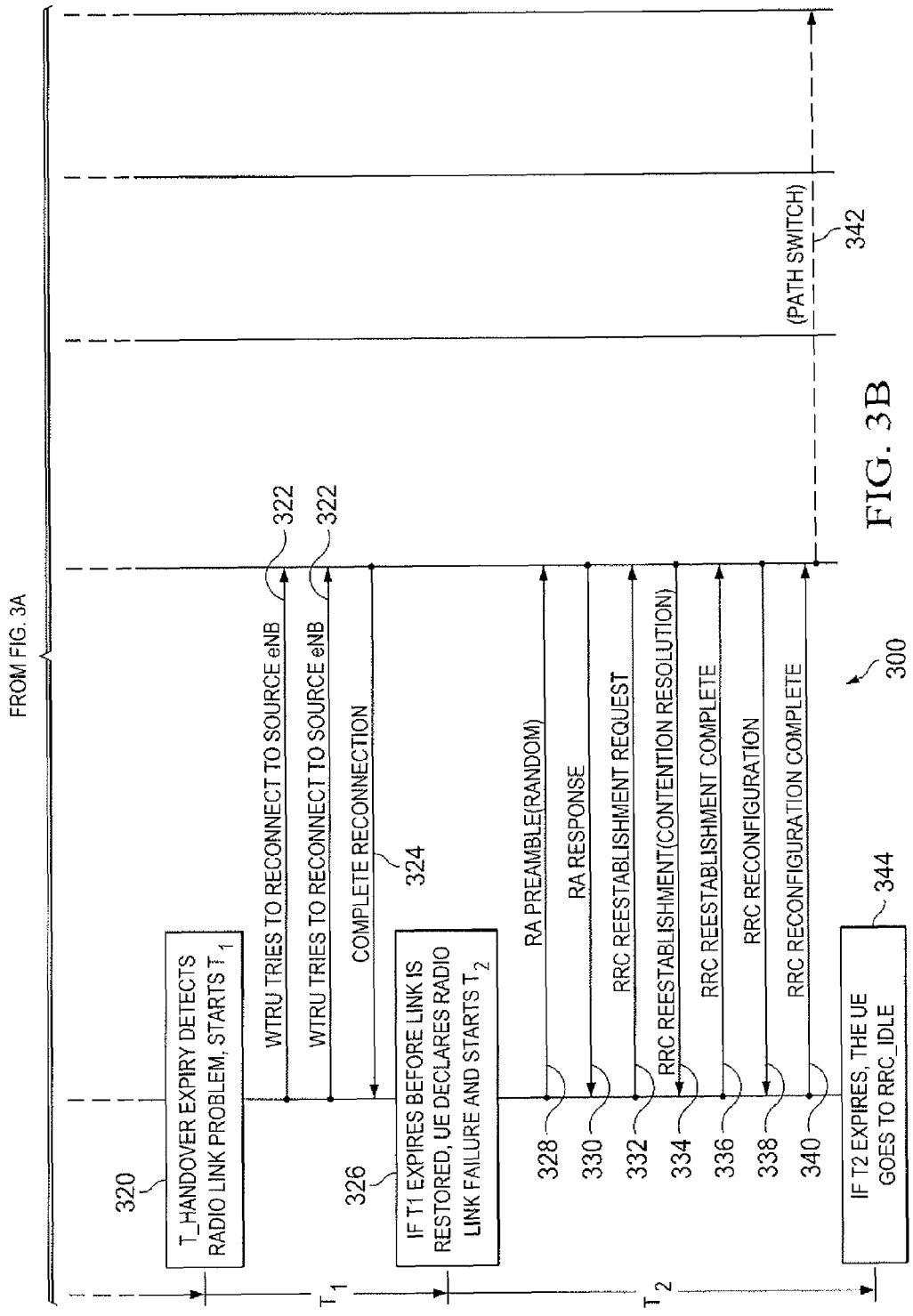

FIGS. 3A and 3B show a signaling diagram of an intra-LTE handover process 300 for managing radio link failures in accordance with another embodiment of the present invention. Although the various embodiments of the present invention are described solely in terms of intra-LTE handover, the invention is not limited in this regard. Rather, the various embodiments of the present invention are equally applicable to recovery from any other type of radio link failures. In process 300, as shown in FIG. 3A, the WTRU 152 sends a radio resource control (RRC) measurement report to the source eNB 154 indicating the measured quality of signals from eNB 154 to WTRU 152 (step 302). The source eNB 154 makes a handover decision based on the measurement report and the result of its own measurement (step 304). The source eNB 154 then sends a handover (HO) request to a target eNB 156 (step 306). The target eNB 156 performs an admission control for the WTRU 152 (step 308). If the target eNB 156 can accept the WTRU 152, the target eNB 156 sends a HO response to the source eNB 154 indicating that a handover should commence (step 310). The source eNB 154 then sends an RRC reconfiguration or HO command to the WTRU 152 (step 312). The WTRU 152 can then begin the handover process (step 314).

The HO command can include reconfiguration information including, but not limited to information for specifying RRC, radio link control (RLC), medium access control (MAC) and physical (PHY) layer. The HO command can also include information regarding timing adjustment when handing over from the source eNB 154 to the target eNB 156, (i.e., whether the WTRU 152 should perform timing adjustment autonomously or using a random access channel (RACH) procedure. If a RACH is to be used, the information can also specify whether random or dedicated access signature will be used, or the like). The HO command can further include relative timing difference information between eNBs (or cells) for autonomous timing adjustment, information regarding initial radio resource scheduling procedure at the target eNB 156, measurement information for the target eNB 156, and the like. The information regarding the initial scheduling procedure at the target eNB 156 indicates whether a RACH access procedure should be used for a resource assignment request or the target eNB 156 can schedule resources for the WTRU 152 without receiving an explicit resource assignment request from the WTRU 152. Alternatively, the measurement configuration and other configuration information can be sent to the WTRU 152 by the target eNB 156 after receiving a handover complete message from the WTRU 152.

In general, a U-plane tunnel can be established between the source eNB 154 and the target eNB 156 to provide a seamless handover. After sending the HO command in step 312, the source eNB 154 can forward the user data to the target eNB 156. The forwarding can take place in a service dependent and implementation specific way.

Once a handover process has begun, the WTRU 152 can attempt to complete a handover process to a target eNB 156. That is, the WTRU 152 can monitor the handover process to see if an upload and a download link have been established, as previously described in FIGS. 2A and 2B for dedicated and random preambles messages, respectively. However, in the various embodiments of the present invention, the WTRU 152 allows only a limited amount of time for completing the handover process. Therefore, when the handover process begins (step 314), a counter or timer in the WTRU 152 is also initiated to count down a pre-determined time (T_Handover) allotted for connecting and completing the handover process (step 316). Although any amount of time can generally be allotted for T_Handover, a short period can be used to provide a WTRU 152 user with seamless operation. For example, any time period between 50 and 200 ms can be used for a typical LTD communications system. Thus, as long as T_Handover has not elapsed, the WTRU 152 can repeatedly attempt to contact and reconnect with the target eNB 156 until a connection is established (step 317). If a handover is completed successfully at WTRU 152, the WTRU 152 can attempt to complete the remainder of the handover process (step 318) to the target eNB as described in FIG. 1 in steps 114-124.

In the various embodiments of the present invention, timers and counters can be used interchangeably. However, in some embodiments, synchronized timer and/or counters may be used by different elements in the wireless communications system to synchronize monitoring or execution of tasks.

If the handover process is not completed within the allotted time (T_Handover), the WTRU 152 can determine that the interruption is a radio link problem between the WTRU 152 and the target eNB 156 and the method 300 can continue, as shown in FIG. 3B. In the various embodiments of the present invention, the WTRU 152 attempts to recover from the radio link failure by halt the handover process and reestablishing the radio link between the source eNB 154 for the WTRU 152. However, the radio link failure recovery process is also generally limited in time. That is, upon determining that any type of radio link failure has occurred, the WTRU 152 starts a second timer to count down a second pre-determined time ($T_1$) allotted for reestablishing the connection with the source eNB 154 (step 320), as shown in FIG. 3B. Similar as described above with respect to steps 317 and 318 in FIG. 3A, the WTRU 152 can repeatedly attempt to contact and reestablish a connection with the source eNB (step 322) for the duration of the second pre-determined time allotted ($T_1$). Although any amount of time can be allotted for $T_1$, a short period can be used to provide a WTRU 152 user with seamless operation. For example, any time period between 50 and 200 ms can be used for a typical LTE communications system. Therefore, until the time allotted ($T_1$) elapses, the WTRU 152 can continue making attempts to reconnect with the source eNB 154. If a reconnection is successful, the WTRU 152 can reinstate the original communications link with the source eNB 154 (step 324).

In some cases, the WTRU 152 may be outside the range of the source eNB 154 or the source eNB 152 may be unavailable for other reasons. Accordingly, in such cases, the WTRU 152 can determine that the unavailability of both the source eNB 154 and the target eNB indicates that a radio link failure has occurred and that a new radio link needs to be established. Consequently, in some embodiments of the present invention, the WTRU 152, upon determination of such any type of radio link failure, can attempt to re-establish a connection with any available eNB. Therefore, upon determining a radio link failure has occurred, the WTRU 152 starts a third timer to count down a third pre-determined time ($T_2$) allotted for establishing a connection with any of eNBs 154, 156, and 357 (step 326). Subsequently or in combination with initiating the third timer, the WTRU 152 can repeatedly attempt to detect and establish a connection with any of eNBs 154, 156, and 357 in communications range. Although any amount of time can be allotted for $T_2$, a longer period than T, can be used to allow the WTRU 152 to locate at least one available eNB. For example, any time period between 0.5 and 10 s can be used for a typical LTE communications system. Therefore, until the time allotted ($T_2$) elapses, the WTRU 152 can continue making attempts to contact one of eNBs 154, 156, and 357.

The connection establishment procedure can proceed by first synchronizing a WTRU 152 with any of eNBs 154, 156, and 357 by exchanging RA messages. In particular, the WTRU 152 can transmit a message specifying a random preamble (step 328) followed by a reply from the contacted one of eNBs 154, 156, and 357. The contacted eNB can then transmit a RA response message to the WTRU 152 (step 330). The connection establishment process can then proceed by using an RRC re-establishment and re-configuration process, That is, an RRC re-establishment request can be transmitted from the WTRU 152 to the contact one of eNBs 154, 156, and 357 (step 332). In response, the contacted one of eNBs 154, 156, and 357 can transmit a RRC re-establishment message including a contention resolution (step 334) as previously described with respect to step 118 (contention resolution), as shown in FIG. 1. The WTRU 152 can then transmit back a message indicating receipt of a valid RRC contention resolution, indicating the RRC re-establishment has been completed (step 336). Afterwards, the contacted one of eNBs 154, 156, and 357 can transmit a RRC reconfiguration message (step 338) to finalize the configuration of the WRTU 152. Finally, the WTRU 152 can transmit a RRC reconfiguration complete message (step 340) to signal that the WRTU 152 is ready to receive data communications. Subsequently or in combination with steps 336 and 338, the MME/UPE 158 can be notified of the U-plane path switch (step 342).

Although steps 328-340 have been described in terms of a response to a radio link failure, the invention is not limited in this regard. In some embodiments, step 324 can also include the same or similar synchronization, re-establishment, and reconfiguration steps described in steps 328-340.

In some cases, the WTRU 152 can be outside the range or any of eNBs 154, 156, and 357 or these eNBs may be otherwise unavailable. In such cases, the WTRU can determine that no connection is possible and that the WTRU 152 should change to a standby or idle mode. Therefore, in the various embodiments of the present invention, if the time allotted ($T_2$) expires and the WTRU 152 has been unable to establish a connection with one of eNBs 154, 156, and 357, WTRU 152 can switch to an RRC_IDLE mode. That is, the WTRU 152 switches to a standby mode in which it no longer attempts to connect with an eNB until requested by the user and/or an eNB is detected by the WTRU 152. During such an idle state, no user place communication data will be exchanged.

These are but a few examples. Accordingly, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for handover of a wireless transmit/receive unit (WTRU) from a source base station to a target base station in a wireless communication system, the method comprising:
   configuring said WTRU to begin a radio link handover procedure responsive to receiving a handover (HO) command from said source base station over a first communications link;
   specifying a first time at said WTRU;
   reconfiguring said WTRU to begin a radio link interruption procedure responsive to an expiry of said first time prior to completion of said radio link handover procedure, said radio link interruption procedure first attempting to re-establish said first communications link;
   specifying a second time;
   commencing re-establishment of said first communications link between said WTRU and said source base station;
   identifying an alternate base station for communicating with said WTRU if said first communications link between said WTRU and said source base station is not re-established by an end of said second time; and
   initiating establishment of a third communications link with said alternate base station;
   wherein said commencing re-establishment of said second communications link comprises:
   synchronizing said WTRU and said source base station; and
   exchanging a pre-determined set of radio resource control messages between said WTRU and said source base station over said second communications link.

2. The method of claim 1, wherein said initiating establishment of said third communications link comprises:
   synchronizing said WTRU and said alternate base station;
   exchanging a pre-determined set of radio resource control messages between said WTRU and said identified base station over said third communications link.

3. The method of claim 1, wherein said reconfiguring further comprises:
   specifying a third time; and
   placing said WTRU in an idle mode if said third communications link is not established by an end of said third time.

4. The method of claim 1, wherein said communications system is a long term evolution (LTE) system.

5. The method of claim 4, wherein said target and said source base stations comprise eNode-B cells.

6. A wireless transmit/receive unit (WTRU) in a wireless communications system, the WTRU comprising:
   a transceiver for transmitting and receiving data from a plurality of base stations; and
   a controller communicatively coupled to said transceiver and configured to adjust an operation mode of said transceiver, said adjusting comprising configuring said transceiver to begin a radio link handover procedure responsive to receiving a handover (HO) command from a first of said plurality of base stations over a first communications link, specifying a first time, and reconfiguring said transceiver to begin a radio link interruption procedure responsive to an expiry of said first time prior to completion of said radio link handover procedure, said radio link interruption procedure first attempting to re-establish said first communications link;
   wherein said controller is further configured during said reconfiguring of said transceiver for:
   specifying a second time,
   commencing re-establishment of said first communications link between said transceiver and said first of said plurality of base stations,
   identifying a currently available base station of said plurality of base stations for communicating with said transceiver if said first communications link is not re-established by an end of said second time, and
   initiating establishment of a third communications link between said transceiver and said available base station;
   wherein said controller is further configured during said re-establishment of said second communications link for:
   synchronizing said transceiver and said first of said plurality of base stations, and
   exchanging a pre-determined set of radio resource control messages between said transceiver and said first of said plurality of base stations over said first communications link.

7. The WTRU of claim 6, wherein said controller is further configured during said establishment of said third communications link for:
   synchronizing said transceiver and said identified one of said plurality of base stations, and
   exchanging a pre-determined set of radio resource control messages between said transceiver and said identified one of said plurality of base stations over said third communications link.

8. The WTRU of claim 6, wherein said controller is further configured during said reconfiguring for:
   specifying a third time; and
   placing said transceiver in an idle mode if said third communications link is not established by an end of said third time.

9. The WTRU of claim 6, wherein said communications system is a long term evolution (LTE) system.

10. The WTRU of claim 5, wherein said target and said source base stations comprise e-Node-B cells.

11. An LTE wireless communications system, the system comprising:
    a source evolved Node-B (eNB);
    a target eNB; and wireless transmit/receive unit (WTRU) the WTRU comprising:
  a transceiver for transmitting and receiving data from at least one base station; and
  a controller communicatively coupled to said transceiver and configured to adjust an operation mode of said transceiver, said adjusting comprising configuring said transceiver to operate in a handover mode responsive to receiving a handover (HO) command from source eNB over a first communications link, said configuring comprising establishing a second communications link between said transceiver and said target eNB, specifying a first time, beginning an exchange of a pre-determined set of handover messages between said transceiver and said target eNB over said second communications link, terminating said second communications link if said exchange of said handover messages is incomplete prior to an end of said first time, and reconfiguring said transceiver to operate in a non-handover mode responsive to said terminating, said radio link interruption procedure first attempting to re-establish said first communications link;
wherein said system further comprises at least one other enB, and wherein said controller is further configured during said reconfiguring for:
specifying a second time and commencing re-establishment of said first communications link between said transceiver and said source eNB,
  identifying an available one of said source, said target, and said other eNBs for communicating with said WTRU if said first communications link is not re-established by an end of said second time, and
specifying a third time and initiating establishment of a third communications link between said transceiver and said identified one of said eNBs, and
  placing said transceiver in an idle mode if said third communications link is not established by an end of said third time;
wherein said controller is further configured during said re-establishment of said second communications link for:
synchronizing said transceiver and said source eNB, and
exchanging a pre-determined set of radio resource control messages between said transceiver and said source eNB over said first communications link.

12. The system of claim 11, wherein said controller is further configured during said establishment of said third communications link for:
  synchronizing said transceiver and said identified one of said eNBs, and
  exchanging a pre-determined set of radio resource control messages between said transceiver and said identified one of said eNBs over said third communications link.

* * * * *